United States Patent
Hofer

(10) Patent No.: US 12,355,053 B2
(45) Date of Patent: Jul. 8, 2025

(54) SYSTEMS AND METHODS FOR COOLING POWER ELECTRONICS IN AN ENERGY STORAGE SYSTEM

(71) Applicant: GE Grid Solutions LLC, Atlanta, GA (US)

(72) Inventor: Douglas C. Hofer, Clifton Park, NY (US)

(73) Assignee: GE GRID SOLUTIONS LLC, Atlanta, GA (US)

( * ) Notice: Subject to any disclaimer, the term of this patent is extended or adjusted under 35 U.S.C. 154(b) by 655 days.

(21) Appl. No.: 17/436,375

(22) PCT Filed: Mar. 5, 2019

(86) PCT No.: PCT/US2019/020745
§ 371 (c)(1),
(2) Date: Sep. 3, 2021

(87) PCT Pub. No.: WO2020/180302
PCT Pub. Date: Sep. 10, 2020

(65) Prior Publication Data
US 2022/0140421 A1  May 5, 2022

(51) Int. Cl.
*H01M 10/667* (2014.01)
*H01M 10/613* (2014.01)
(Continued)

(52) U.S. Cl.
CPC ....... *H01M 10/667* (2015.04); *H01M 10/613* (2015.04); *H01M 10/6551* (2015.04); *H01M 10/6563* (2015.04); *H01M 10/658* (2015.04)

(58) Field of Classification Search
None
See application file for complete search history.

(56) References Cited

U.S. PATENT DOCUMENTS

| 5,258,888 A | 11/1993 | Korinsky |
| 5,320,190 A * | 6/1994 | Naumann ......... H01M 10/6566 180/68.5 |

(Continued)

FOREIGN PATENT DOCUMENTS

| DE | 4029018 A1 * | 3/1992 | |
| EP | 1897739 A1 * | 3/2008 | ............... B60K 1/04 |

(Continued)

OTHER PUBLICATIONS

Machine translation of JP2008-041376, published on Feb. 21, 2008 (Year: 2008).*

(Continued)

*Primary Examiner* — Anca Eoff
(74) *Attorney, Agent, or Firm* — Armstrong Teasdale LLP

(57) ABSTRACT

An energy storage system is provided. The energy storage system includes a first housing comprising thermal insulation, the first housing defining a lower temperature region, at least one energy storage module positioned within said first housing, and an electronics assembly positioned within the lower temperature region of said first housing. The electronics assembly includes a second housing comprising thermal insulation, the second housing defining a higher temperature region that is thermally isolated from the lower temperature region, at least one power electronics component positioned within the higher temperature region of the second housing, and an air conduit extending through said second housing, the air conduit configured to channel ambient air external to the first housing through the higher temperature region to cool said at least one power electronics component.

20 Claims, 2 Drawing Sheets

(51) Int. Cl.
    *H01M 10/6551*     (2014.01)
    *H01M 10/6563*     (2014.01)
    *H01M 10/658*     (2014.01)

(56) References Cited

U.S. PATENT DOCUMENTS

| | | | |
|---|---|---|---|
| 6,304,444 | B1 | 10/2001 | Combs et al. |
| 6,909,607 | B2 | 6/2005 | Radosevich et al. |
| 7,187,548 | B2 | 3/2007 | Meyer et al. |
| 8,335,081 | B2 | 12/2012 | Weiss |
| 9,310,112 | B2 | 4/2016 | Bell et al. |
| 2004/0070378 | A1* | 4/2004 | Baldwin ............ H02M 3/1588 323/282 |
| 2008/0196957 | A1 | 8/2008 | Koelke et al. |
| 2010/0171400 | A1* | 7/2010 | Hill .................... H05K 7/20618 312/236 |
| 2017/0225585 | A1 | 8/2017 | Saigo |
| 2017/0365897 | A1 | 12/2017 | Okada et al. |

FOREIGN PATENT DOCUMENTS

| | | |
|---|---|---|
| EP | 2435265 A1 | 4/2012 |
| EP | 2866255 B1 | 12/2016 |
| JP | 2008041376 A | 2/2008 |
| JP | 4404726 B2 | 1/2010 |
| JP | 6400838 B2 | 10/2018 |

OTHER PUBLICATIONS

Machine translation of DE 40 29 018 A1, published on Mar. 19, 1992 (Year: 1992).*
Thermoelectric Cooling for Power Density Maximisation of Power, J. Biela, and J. W. Kolar, General Electric, p. 1, Feb. 25, 2019.
Cooling of Power Electronics, Eldre, Ferraz Shawmut, and R-Theta, General Electric, p. 9, Feb. 25, 2019.
International Search Report and Written Opinion, dated Nov. 8, 2019, for International application No. PCT/US2019/020745 (13 pages).

* cited by examiner

SYSTEMS AND METHODS FOR COOLING POWER ELECTRONICS IN AN ENERGY STORAGE SYSTEM

CROSS-REFERENCE TO RELATED APPLICATIONS

This application is a National Stage Patent Application under 35 USC § 371 and claims the benefit of the International Application No. PCT/US2019/020745, filed on Mar. 5, 2019, which is incorporated by reference in its entirety.

BACKGROUND

The field of the disclosure relates generally to electrical energy storage systems, and more particularly, to cooling systems for power electronics in an energy storage system.

Battery energy storage systems store electrical energy in batteries that may be used to power a load. These systems use power electronics devices to convert electrical energy in the batteries to different forms of electrical energy, including direct current (DC) power or alternating current (AC) power at different voltages. These power electronic devices generate heat during operation which must be removed and transferred to the ambient environment to avoid overheating the power electronics and batteries. Power electronics can typically tolerate higher temperatures than batteries.

At least some known battery energy storage systems use a cooling system such as a heating, ventilation, and air conditioning (HVAC) system to cool power electronics and batteries. However, because of the different temperature requirements for power electronics and batteries, it is inefficient to cool power electronics to the same extent as batteries. It would therefore be desirable to have a more energy efficient cooling system for battery energy storage systems.

BRIEF DESCRIPTION

In one aspect, an energy storage system is provided. The energy storage system includes a first housing including thermal insulation. The first housing defines a lower temperature region. The energy storage system also includes at least one energy storage module positioned within the first housing and an electronics assembly positioned within the lower temperature region of the first housing. The electronics assembly includes a second housing including thermal insulation. The second housing defines a higher temperature region that is thermally isolated from the lower temperature region. The electronics assembly also includes at least one power electronics component positioned within the higher temperature region of the second housing and an air conduit extending through the second housing. The air conduit is configured to channel ambient air external to the first housing through the higher temperature region to cool the at least one power electronics component.

In another aspect, an electronics assembly for an energy storage system is provided. The electronics assembly includes an inner housing including thermal insulation. The inner housing defines a higher temperature region and is positioned within an outer housing of the energy storage system. The electronics assembly also includes at least one power electronics component positioned within the inner housing and an air conduit extending through the inner housing. The air conduit is configured to channel ambient air external to the outer housing of the energy storage system through the higher temperature region to cool the at least one power electronics component.

In yet another aspect, a method of cooling an energy storage system is provided. The method includes cooling, using a heating, ventilation, and air conditioning (HVAC) system, at least one energy storage module positioned within a first housing. The method also includes cooling, using ambient air, at least one power electronics component positioned within a second housing. The second housing is positioned within the first housing. The second housing includes an air conduit configured to channel the ambient air external to the first housing through the second housing.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The systems and methods described herein provide a cooling system for an energy storage system that cools a higher temperature region containing at least one power electronics component with ambient air exterior to the battery energy storage system.

Figure 1:
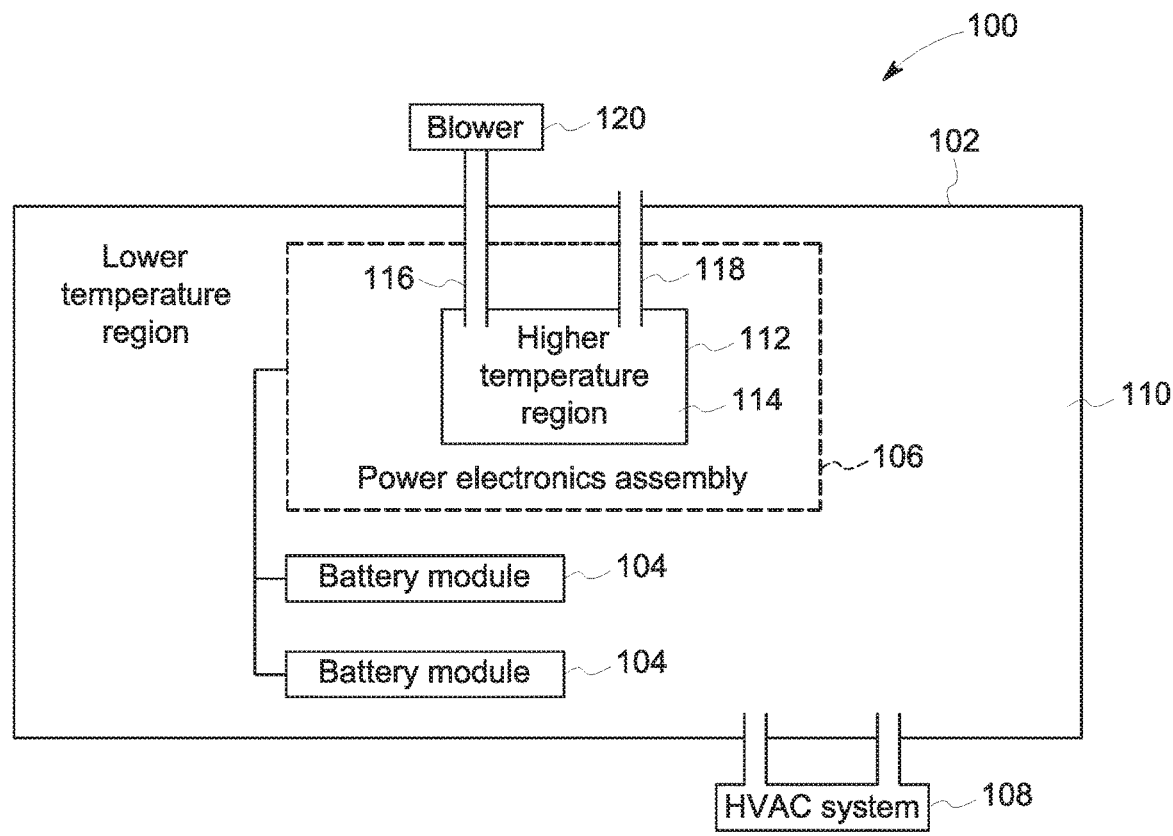
FIG. 1 is a diagram of an exemplary energy storage system.

FIG. 1 is a diagram of an exemplary energy storage system 100. Energy storage system 100 includes a system housing 102, at least one energy storage module 104, a power electronics assembly 106, and a heating, ventilation, and air conditioning (HVAC) system 108. In one embodiment, energy storage module 104 is a battery module 104.

System housing 102 is formed of thermal insulation (e.g., fiberglass or polystyrene foam) and defines a lower temperature region 110. Lower temperature region 110 is thermally isolated from an exterior of system housing 102, such that lower temperature region 110 may have a different temperature from an ambient temperature of the air exterior to system housing 102. In the example embodiment, HVAC system 108 is configured to cool lower temperature region 110.

Battery modules 104 store electrical energy that may be used to power a load. Battery modules 104 may include, for example, one or more rechargeable battery cells. Battery modules 104 may be charged with direct current (DC) power that causes battery modules 104 to store energy, for example, by converting electrical energy transferred by the DC power into chemical energy. When battery modules 104 are charged, battery modules 104 are capable of providing DC power that can be utilized to power an electrical load. Battery modules 104 generate heat and are generally not capable of tolerating relatively high temperatures. For example, battery module 104 may not be capable of tolerating temperatures greater than 35° C. Battery modules 104 are contained within lower temperature region 110 of system housing 102, enabling battery modules 104 to be cooled by HVAC system 108. In certain embodiments, lower temperature region 110 has a nominal temperature range of 25° C.±10° C. and a temperature range of 25° C.±25° C. at the extreme.

It may be desirable to charge battery modules 104 with power other than DC power (e.g., alternating current (AC) power or DC power of a different voltage), or convert the DC power provided by battery modules 104 to power a load (e.g., AC power or DC power having a different voltage). This power conversion may be performed by components of power electronics assembly 106 in energy storage system 100.

Power electronics assembly 106 includes an internal housing 112 formed of thermal insulation. Internal housing 112 defines a higher temperature region 114 that is thermally isolated from lower temperature region 110 by internal housing 112, such that higher temperature region 114 has a different temperature than lower temperature region 110. In certain embodiments, higher temperature region 114 has a temperature greater than 50° C. Because higher temperature region 114 is thermally isolated from lower temperature region 110, higher temperature region 114 is not cooled by HVAC system 108. An inlet duct 116, an outlet duct 118, and a blower 120 form a separate cooling system that cools higher temperature region 114. Higher temperature region 114 is coupled to inlet duct 116 and outlet duct 118 that enable ambient air external to system housing 102 to be channeled through higher temperature region 114 and cool higher temperature region 114. Inlet duct 116 is coupled in flow communication with blower 120 that channels ambient air through inlet duct 116, through higher temperature region 114, and through outlet duct 118. Alternatively, blower 120 may be coupled to outlet duct 118.

Power electronics assembly 106 is configured to convert one power to another type of power in the exemplary embodiment. For example, power electronics assembly 106 may convert an input power (e.g., AC line power) to DC power in order to charge battery modules 104. Power electronics assembly may also convert DC power produced by battery modules 104 into a different type of power (e.g., AC line power or DC power having a different voltage). Power electronics assembly 106 may include a plurality of power electronics components. Some of the plurality of power electronics components may be components that produce heat and are capable of tolerating higher temperatures than, for example, battery modules 104. Such components are cooled by ambient air moving through internal housing 112 and are thermally isolated from components in lower temperature region 110 by internal housing 112. Thus, components in lower temperature region 110 are protected from high temperatures within internal housing 112, and components within internal housing 112 do not place an additional cooling load on HVAC system 108, reducing the energy consumption of HVAC system 108.

Figure 2:
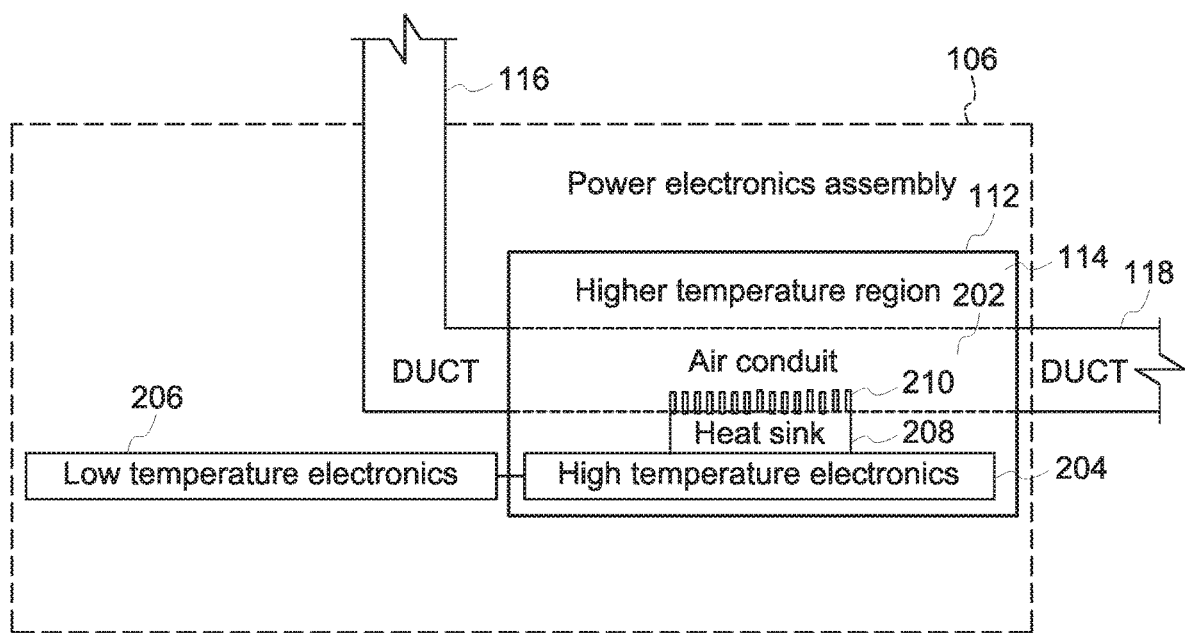
FIG. 2 is a diagram of an exemplary electronics assembly that may be included in the energy storage system shown in FIG. 1.

FIG. 2 is a schematic diagram of power electronics assembly 106. Power electronics assembly 106 includes internal housing 112, an air conduit 202, at least one high temperature power electronic component 204, and at least one low temperature power electronic component 206. Internal housing 112 functions as described with respect to FIG. 1.

Air conduit 202 extends through internal housing 112 and channels ambient air through internal housing 112 to cool higher temperature region 114. Internal housing 112 is coupled to inlet duct 116 and outlet duct 118 such that ambient air is channeled from the exterior of system housing 102 (shown in FIG. 1) through inlet duct 116, air conduit 202, and outlet duct 118.

In the exemplary embodiment, high temperature power electronic components 204 are power electronic components that produce heat and are capable of tolerating higher temperatures than, for example, battery modules 104 (shown in FIG. 1) or low temperature power electronic components 206. High temperature power electronic components 204 are cooled by ambient air channeled through air conduit 202. High temperature power electronic components may be adjacent to and/or coupled to a heat sink 208. Heat sink 208 has a plurality of fins 210 that extend into air conduit 202, enabling heat to be transferred from high temperature power electronic components 204 to ambient air channeled through air conduit 202. Because high temperature power electronic components 204 are thermally isolated from lower temperature region 110 by internal housing 112, high temperature power electronic components 204 do not impact the temperature of battery modules 104 (shown in FIG. 1) or low temperature power electronic components 206, and do not require cooling by HVAC system 108, reducing the energy consumption of HVAC system 108. High temperature power electronic components 204 may include, for example, semiconductor switches or inductors.

Low temperature power electronic components 206 are power electronic components that may produce less heat than high temperature power electronic components 204 and may not be capable of tolerating temperatures as high as high temperature power electronic components 204. Low temperature power electronic components 206 are positioned exterior to internal housing 112, such that low temperature power electronic components 206 are thermally isolated from high temperature power electronic components 204. Low temperature power electronic components 206 are contained within lower temperature region 110 (shown in FIG. 1) and cooled by HVAC system 108 (shown in FIG. 1). Low temperature power electronic components 206 may include, for example, microcontrollers and sensors.

Figure 3:
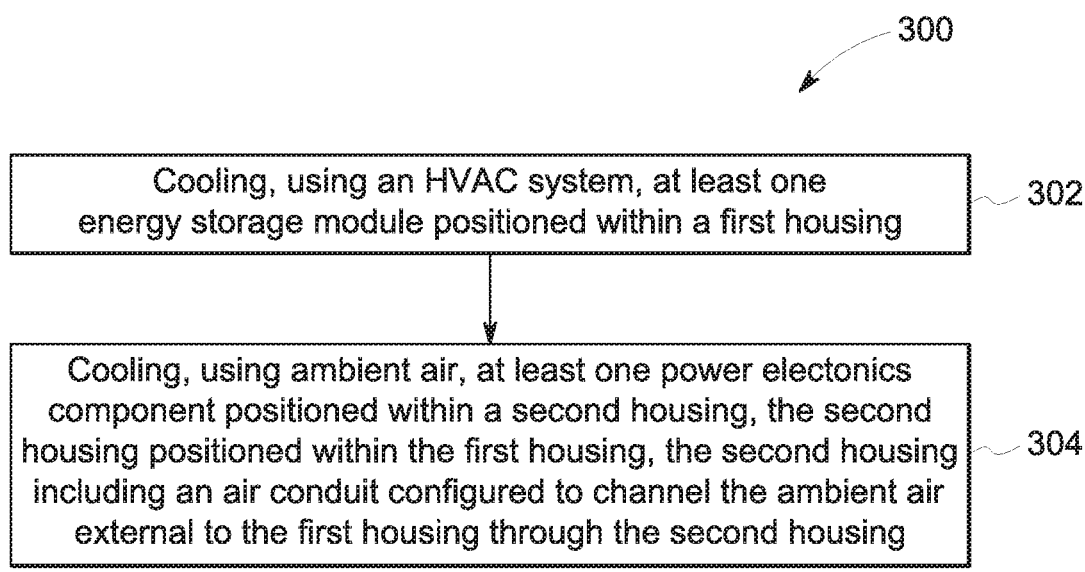
FIG. 3 is a flowchart of an exemplary method for assembling an energy storage system such as the system shown in FIG. 1.

FIG. 3 is a flowchart of an exemplary method 300 for cooling an energy storage system such as energy storage system 100 shown in FIG. 1.

Method 300 includes cooling 302, using a heating, ventilation, and air conditioning (HVAC) system, at least one energy storage module positioned within a first housing. Method 300 also includes cooling 304, using ambient air, at least one power electronics component positioned within a second housing. The second housing is positioned within the first housing. The second housing includes an air conduit configured to channel the ambient air external to the first housing through the second housing.

The embodiments described herein include an energy storage system that cools a higher temperature region containing at least one power electronics component with ambient air exterior to the energy storage system. The energy storage system includes a first housing, at least one battery module, an electronics assembly, and a heating, ventilation, and air conditioning (HVAC) system or other cooling system. The electronics assembly includes a second housing, at least one power electronics component contained within the second housing, and an air conduit extending through the second housing configured to channel ambient air external to the first housing through the higher temperature region to cool said at least one power electronics component.

An exemplary technical effect of the methods, systems, and apparatus described herein includes at least one of: (a) protecting heat-sensitive components of an energy storage system by thermally isolating heat-sensitive components from high temperature components; and (b) increasing the energy efficiency of cooling an energy storage system by isolating and separately cooling groups of components having different heat tolerance levels.

Exemplary embodiments of an energy storage system are described herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the exemplary embodiment can be implemented and utilized in connection with many other electronic systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An energy storage system comprising:
   a first housing comprising thermal insulation, said first housing defining a lower temperature region;
   at least one energy storage module positioned within said first housing; and
   an electronics assembly positioned within the lower temperature region of said first housing, said electronics assembly comprising:
      a second housing comprising thermal insulation, said second housing defining a higher temperature region that is thermally isolated from the lower temperature region;
      at least one power electronics component positioned within the higher temperature region of said second housing;
      an air conduit extending through said second housing, said air conduit configured to channel ambient air external to said first housing through the higher temperature region to cool said at least one power electronics component;
      an inlet duct in flow communication with said air conduit, said inlet duct coupled to said second housing and extending through said first housing; and
      an outlet duct in flow communication with said air conduit, opposite said inlet duct, said outlet duct coupled to said second housing and extending through said first housing.

2. The energy storage system of claim 1, wherein said at least one energy storage module comprises a battery module.

3. The energy storage system of claim 1, wherein said electronics assembly further comprises at least one additional power electronics component external to said second housing and positioned within the lower temperature region of said first housing.

4. The energy storage system of claim 1, wherein said electronics assembly further comprises a heat sink configured to transfer heat from said at least one power electronics component to said air conduit.

5. The energy storage system of claim 4, wherein said heat sink comprises a plurality of fins extending into said air conduit.

6. The energy storage system of claim 1, wherein said at least one power electronics component comprises at least one of a semiconductor switch and an inductor.

7. The energy storage system of claim 1, further comprising a blower coupled in flow communication with said air conduit, said blower configured to channel the ambient air through said air conduit.

8. The energy storage system of claim 1, wherein the lower temperature region defined by said first housing is configured to be cooled to a temperature lower than a temperature of the higher temperature region.

9. The energy storage system of claim 1, further comprising a heating, ventilation, and air conditioning system configured to cool the lower temperature region, wherein said air conduit is separate from said heating, ventilation, and air conditioning system.

10. An electronics assembly for an energy storage system, said electronics assembly comprising:
    an inner housing comprising thermal insulation and defining a higher temperature region, said inner housing positioned within an outer housing of the energy storage system;
    at least one power electronics component positioned within said inner housing;
    an air conduit extending through said inner housing, said air conduit configured to channel ambient air external to the outer housing of the energy storage system through the higher temperature region to cool said at least one power electronics component;
    an inlet duct in flow communication with said air conduit, said inlet duct coupled to said inner housing and extending through the outer housing of the energy storage system; and
    an outlet duct in flow communication with said air conduit, opposite said inlet duct, said outlet duct coupled to said inner housing and extending through the outer housing of the energy storage system.

11. The electronics assembly of claim 10, further comprising at least one additional power electronics component external to said inner housing.

12. The electronics assembly of claim 10, further comprising a heat sink configured to transfer heat from said at least one power electronics component to said air conduit.

13. The electronics assembly of claim 12, wherein said heat sink comprises a plurality of fins extending into said air conduit.

14. The electronics assembly of claim 10, wherein said at least one power electronics component comprises at least one of a semiconductor switch and an inductor.

15. The electronics assembly of claim 10, wherein said air conduit is in flow communication with a blower configured to channel the ambient air through said air conduit.

16. A method of cooling an energy storage system, said method comprising:
   cooling, using a heating, ventilation, and air conditioning (HVAC) system, at least one energy storage module positioned within a first housing; and
   cooling at least one power electronics component positioned within a second housing using ambient air supplied by an inlet duct coupled to the second housing, the second housing positioned within the first housing, and the second housing including an air conduit in flow communication with the inlet duct and configured to channel the ambient air external to the first housing through the second housing and exhaust the ambient air from the second housing via an outlet duct in flow communication with the air conduit,
   wherein the inlet duct is coupled to the second housing and extends through the first housing, and the outlet duct, positioned opposite the inlet duct, is coupled to the second housing and extends through the first housing.

17. The method of claim 16, further comprising cooling, using the HVAC system, at least one additional power electronics component positioned external to the second housing and within the first housing.

18. The method of claim 16, wherein cooling the at least one power electronics component comprises transferring heat from the at least one power electronics component to the air conduit with a heat sink.

19. The method of claim 16, wherein cooling the at least one power electronics component comprises cooling at least one of a semiconductor switch and an inductor.

20. The method of claim 16, wherein cooling the at least one power electronics component comprises channeling ambient air through the air conduit using a blower coupled in flow communication to the air conduit.

* * * * *